I. E. ANDREW.
HARROW ATTACHMENT.
APPLICATION FILED JUNE 15, 1912.
1,057,992.
Patented Apr. 1, 1913.
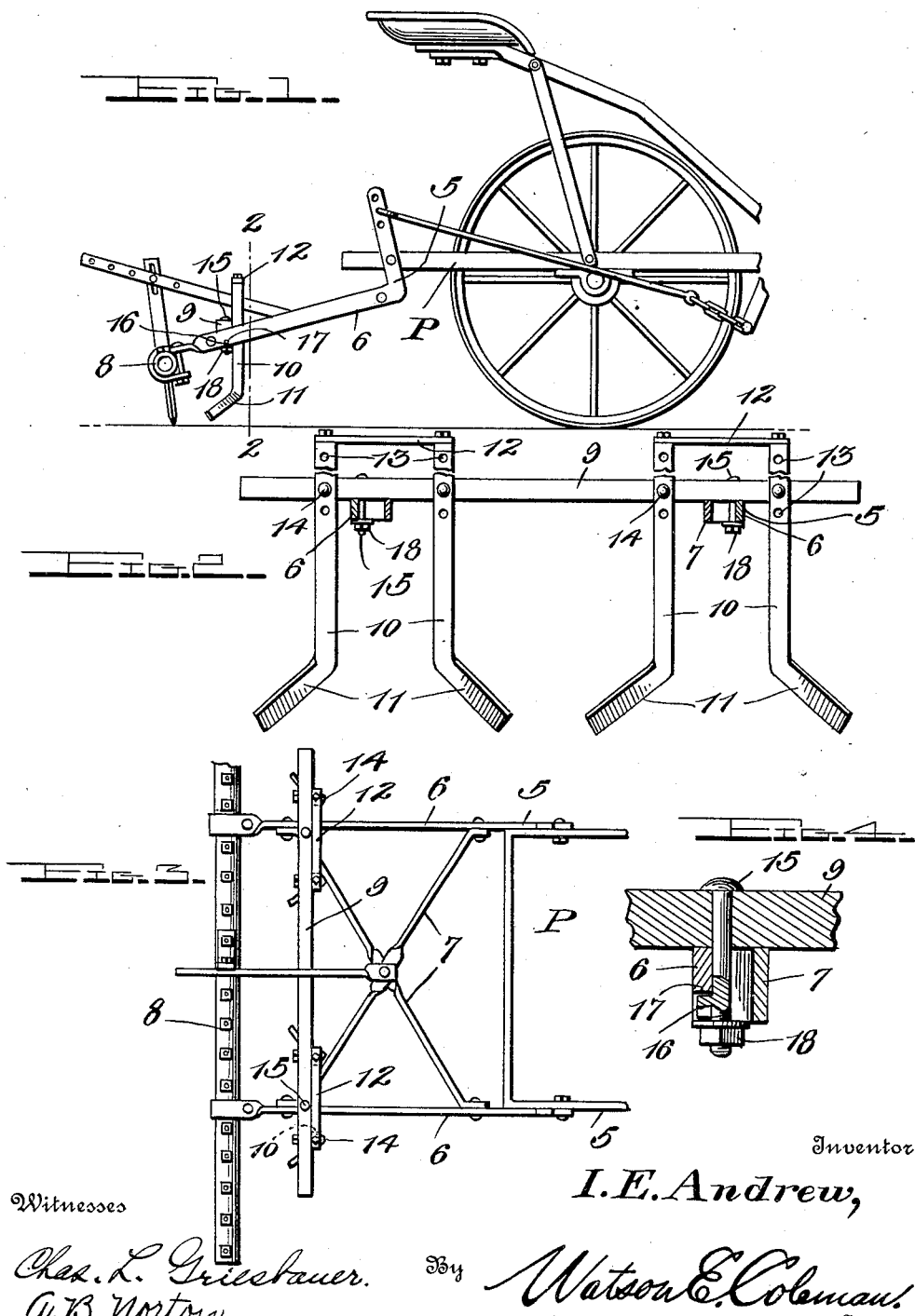
Witnesses
Chas. L. Griestauer.
A. B. Norton.
Inventor
I. E. Andrew,
By Watson E. Coleman,
Attorney

UNITED STATES PATENT OFFICE.

IRVING E. ANDREW, OF NEWHALL, IOWA.

HARROW ATTACHMENT.

1,057,992. Specification of Letters Patent. Patented Apr. 1, 1913.

Application filed June 15, 1912. Serial No. 703,896.

*To all whom it may concern:*

Be it known that I, IRVING E. ANDREW, a citizen of the United States, residing at Newhall, in the county of Benton and State of Iowa, have invented certain new and useful Improvements in Harrow Attachments, of which the following is a specification, reference being had to the accompanying drawings.

This invention relates to an attachment for harrows and more particularly to covering means to be mounted upon the harrow frame for use in connection with a seed planting machine wherein a trailing harrow is provided attached to the rear end of the planter frame, the primary object of the invention being to provide a simple, efficient and durable means for covering the tracks of the wheels of the planting machine in advance of the harrow teeth so that the surface of the soil will be properly harrowed and leveled.

A more specific object of the invention is to provide a bar adapted to be transversely arranged upon the harrow frame, a plurality of vertically disposed covering plates mounted upon the bar, and improved means for easily and quickly attaching the bar to the harrow frame or removing the same therefrom.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing, in which—

Figure 1 is a side elevation of a portion of a planting machine showing a harrow provided with my improved coverer mounted upon the end of the planter frame; Fig. 2 is an enlarged section taken on the line 2—2 of Fig. 1; Fig. 3 is a top plan view of the harrow; and Fig. 4 is an enlarged detail section illustrating means for securing the blade carrying bar upon the harrow frame.

Corresponding and like parts are referred to in the following description and designated in the accompanying drawing by like reference characters.

Referring in detail to the drawing, P designates the frame of a seed planting machine upon the rear end of which the harrow frame 5 is pivotally mounted for vertical movement. This harrow frame consists of parallel side bars 6 connected by the crossed diagonal brace bars 7. In the rear ends of the bars 6 the trailing tooth carrying bar 8 is mounted, said bar being capable of adjustment to dispose the teeth at any desired angle.

A transverse bar 9 is adapted to be arranged upon the harrow frame, said bar projecting at its ends beyond the side bars 6 of said frame. This bar is disposed upon the frame bars 6 adjacent their rear ends and at the point of connection of the diagonal brace bars 7 thereto. The covering members indicated at 10 each consist of a vertically disposed bar having an angularly extending plate or foot 11 formed upon its lower end. These covering members are arranged in pairs upon each end of the bar 9, the members of each pair being disposed upon opposite sides of the respective side bars 6 of the frame. The plates 11 of each pair of members extend in relatively opposite directions and rearwardly or toward the tooth carrying bar 8. The upper ends of each pair of members 10 are rigidly connected and braced by means of the bars 12, said members being each provided with a plurality of openings 13 to receive the securing bolts 14 whereby the covering members are attached to the transverse bar 9.

The bar 9 is removably secured upon the harrow frame by means of the bolts 15. These bolts are disposed through vertical openings in the bar 9 and extend between the side bars 6 of the harrow frame and the ends of the diagonal brace bars 7. The bolts 15 have formed upon their lower ends the laterally extending lugs 16 which are adapted to engage in rectangular notches or recesses 17 provided in the lower edges of the side bars 6 of the harrow frame. Securing nuts 18 are threaded upon the lower ends of the bolts whereby the cross bar 9 is drawn down into clamping engagement upon the frame. It will be obvious that by means of this construction longitudinal movement of the bar 9 upon the harrow frame is effectually prevented upon the pressure of the accumulating earth upon the angularly disposed covering plates 11. At the same time, the bar 9 and the covering members may be easily and quickly removed from the harrow frame when it is desired to adjust the covering members, by simply removing the nuts from the lower ends of the bolts 15 and disengaging the lugs 16 of said bolts from the recesses in the frame bars.

From the foregoing description and accompanying drawing, the manner of operation of the device will be obvious. In the movement of the planting machine over the field, deep tracks are left by the supporting wheels, and the oppositely extending pairs of plates 11 force the earth inwardly from each side of the wheel tracks into the tracks to cover the same. The teeth of the harrow bar 8 which is arranged in the rear of the covering members, will properly distribute this earth evenly over the surface of the ground. Thus a smooth and unbroken surface remains after the planting operation is completed, and the proper covering of the seed is also insured.

From the foregoing it will be seen that I have devised a very simple, efficient and durable attachment for harrows which may be easily and quickly applied to or removed from the harrow frame. The covering members may be readily adjusted vertically to dispose the angular plates 11 thereof at any desired distance above the ground surface.

While I have shown and described the preferred construction and arrangement of the various parts it will be understood that the invention is susceptible of considerable modification without departing from the essential features or sacrificing any of the advantages thereof.

Having thus described the invention, what is claimed is:

1. The combination with a harrow frame having parallel side bars and obliquely disposed brace bars connecting the same, of a bar adapted to be transversely arranged upon the harrow frame, spaced pairs of covering members mounted upon said bar, and means for detachably securing said bar to the frame consisting of vertically disposed bolts provided with lugs upon their lower ends, the side bars of the harrow frame having notches to receive said lugs, and nuts threaded upon the lower ends of the bolts.

2. The combination with a harrow frame having parallel side bars and obliquely disposed brace bars connecting the same, of a bar adapted to be transversely arranged upon the harrow frame, spaced pairs of covering members secured to said bar, and bolts disposed through said transverse bar and extending between the side bars and the brace bars of the harrow frame, said bolts having nuts threaded upon their lower ends to engage the frame bars and detachably clamp the transverse bar thereon.

3. The combination with a harrow frame having parallel side bars and obliquely disposed brace bars connecting the same, of a bar adapted to be transversely arranged upon said frame, a pair of covering members adjustably secured upon each end of the bar, the members of each pair being disposed upon opposite sides of one of the side bars of the harrow frame, means connecting the members of each pair at their upper ends, and bolts vertically disposed through the ends of the transverse bar and extending between the side bars and the brace bars of the harrow frame, said bolts being provided with lugs to engage the side bars of the harrow frame, and having nuts threaded upon their lower ends to rigidly clamp the transverse bar upon the frame.

In testimony whereof I hereunto affix my signature in the presence of two witnesses.

IRVING E. ANDREW.

Witnesses:
  H. R. MOLLER,
  E. E. STEDMAN.

---

Copies of this patent may be obtained for five cents each, by addressing the "Commissioner of Patents, Washington, D. C."